Sept. 26, 1939.  T. GANNESTAD  2,174,416
VALVE
Filed July 27, 1938
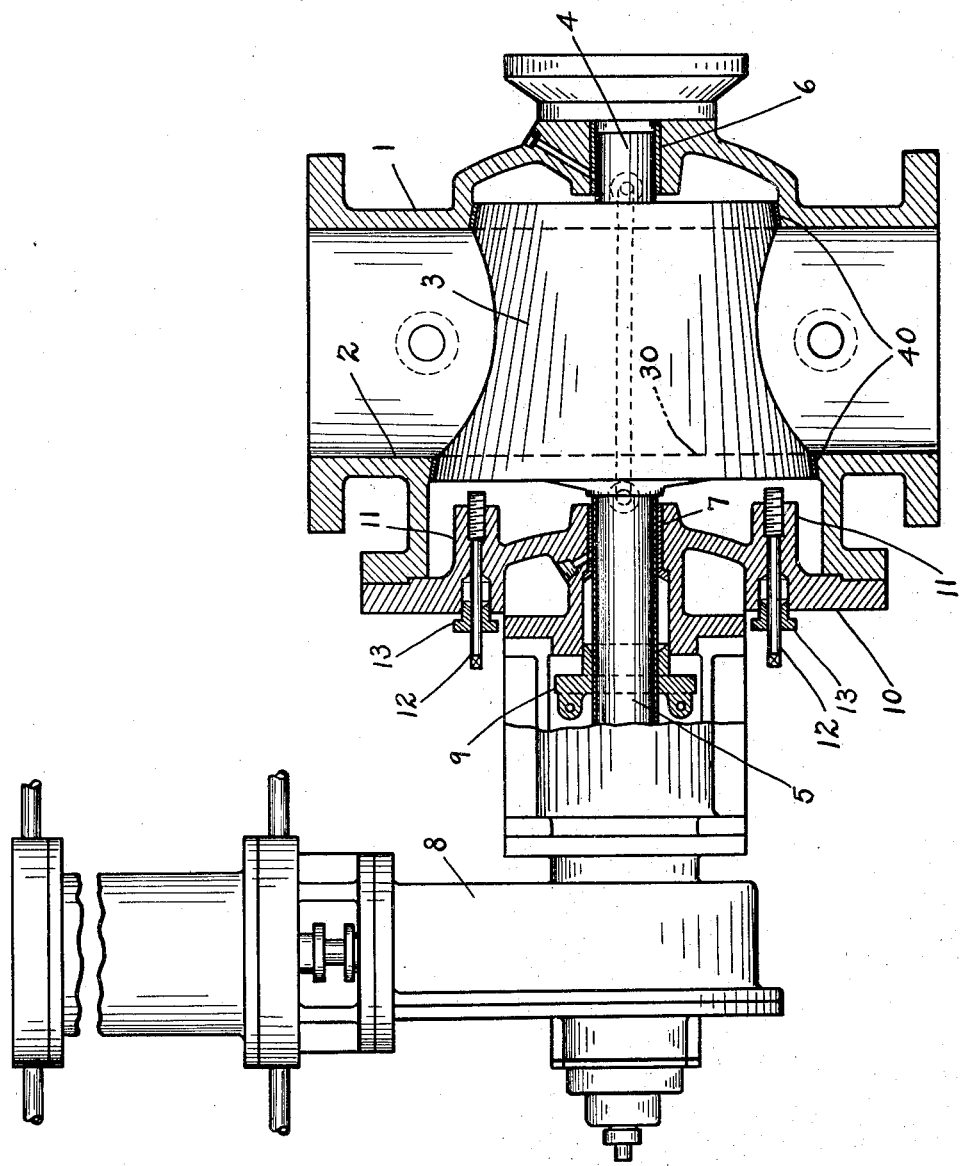
INVENTOR
Thor Gannestad
by Christy and Wharton
attorneys Patented Sept. 26, 1939

2,174,416

UNITED STATES PATENT OFFICE 2,174,416

VALVE

Thor Gannestad, Pittsburgh, Pa.

Application July 27, 1938, Serial No. 221,555

1 Claim. (Cl. 251—163)

My invention relates to cone valves, especially to powerfully operated cone valves, and consists in means of simple and economical construction for locking the valve in seated position, to the end that the valve-operating mechanism may be dismantled for inspection and repair while the valve remains in service.

A valve embodying the invention is illustrated in the accompanying drawing. The valve structure is shown partly in elevation and partly in axial section, with a portion of the power cylinder that operates the valve broken away for compactness of illustration.

The valve consists essentially in body 1 including a passage 2 and a conical plug-valve 3. The body 1 is flanged at its opposite ends for connection in the pipe line in which flow of liquid or gas is to be controlled.

The body 1 of the structure includes a conical seat 40 for the valve 3, and such valve includes a transverse port or passage 30. The valve 3 is rotatable, between a position in which the port 30 is aligned with the passage 2, as illustrated (in which position the passage is open to flow), and a position in which the port 30 lies at 90 degrees to the passage 2 (in which position communication between the port and the passage is blanked and the passage closed to flow). Within such range of rotation, the valve may be adjusted in various positions, to regulate flow through the passage 2.

The conical valve 3 is provided with a journal 4 and stem 5, respectively trunnioned in bearings 6 and 7. The journal 4 and bearing 6 are enclosed in the body of the valve structure, while the stem 5 extends through the bearing 7 to a valve-operating mechanism arranged within a housing 8. The stem 5 is sealed, by means of a packing gland 9, the packing used with the gland being omitted from the drawing for the sake of clarity in illustration. Both the bearing 7 and packing gland 9 are embodied in an integrally formed head-plate or wall portion 10 that, as shown, is rigidly assembled and sealed with the valve body proper.

The mechanism within housing 8 is not illustrated, inasmuch as the invention is not concerned with the particular valve-operating machine employed. There are many known machines that may be used, and as an example I mention the valve-operating mechanism illustrated and described in Letters Patent No. 2,094,066, granted on my application, September 28, 1937. For present purposes suffice it to say that the valve-operating mechanism within housing 8 is, subject to suitable control, adapted axially to shift and rotate the valve-stem 5, in such manner that the valve 3 is first unseated, then rotated into desired flow-controlling position, and then returned to tightly seated position.

As already stated, my invention lies in means for locking the valve in seated position, so that the valve-operating mechanism may be knocked down or removed for inspection or repair, without withdrawing the valve structure itself from service. Advantageously such means are organized in the head-plate or wall portion 10; such means may be and in this case are manually operable, and consist in a plurality of screw-threaded members—adjustable in direction transverse to the axis of passage 2 (preferably in direction parallel to the axis of the valve-stem 5) between a position in which the valve 3 is tightly locked in seated position and a position in which the valve is free for movement in response to the powerful operation of the valve-stem 5.

Referring to the drawing, I provide four bosses 11 on the internal side of the head-plate 10. The bosses are spaced 90 degrees apart concentrically of the valve-stem, and, due to the plane of section of the drawing, only two are to be seen. Each boss is provided with an axial bore, and in such bore a threaded stem 12 is secured. More specifically, the inner end portions of the stems are formed on larger diameter than the bodies of the stems elsewhere; the enlarged portions of the stems are threaded and the bores in the bosses are correspondingly enlarged at their inner ends and threaded for engagement with the threaded ends of the stems. The unthreaded cylindrical body portions of the stems extend outward from the external face of the head-plate 10, and are formed at their outer ends to receive a wrench or crank, whereby the stems may be manually rotated and screwed inward from the inactive position, in which they are shown into engagement with the larger end of the valve 3. That is to say, the stems may be run inward, bringing their inner ends into forceful abutment upon the end of the valve and securing the valve in tightly seated position. When the valve has been so locked to its seat, the valve-operating mechanism may be taken apart or removed.

It is important to note that each stem-receiving bore in the head-plate 10 is radially enlarged at its outer end, and within such enlargement in the bore a packing gland 13 is arranged. Thus, each rotary stem 12 may be and indeed is sealed in the head-plate in which it is axially adjustable.

It will be understood that the concentric arrangement of the stems 12 with respect to the axis of the stem 5 provides an uniform distribution of stress when the stems are run inward and bear forcefully upon the valve. Such distribution of stress insures that the valve will be held with uniformly distributed pressure upon its seat.

I claim as my invention:

In a valve structure including a body provided with a passage for fluid and a conical valve seat, a conical valve including a transverse port, a valve stem extending axially from the valve, the body of said structure including a head provided with a bearing and a packing gland through which said stem extends, and means cooperating with said stem for axially shifting said valve to and from said seat and rotating the valve, when unseated, between a position in which said port communicates with said passage and a position in which such communication is blanked; the refinements herein described that consist in a plurality of outwardly pocketed, inwardly threaded passages extending though said head at points spaced both radially outward from and circumferentially of said valve stem, screws severally threaded partway of their length and severally extending through said passages in threaded engagement with the threaded portions thereof, packing glands severally cooperating with the pocketed portions of said passages and with the unthreaded portions of said screws, and the inner ends of said screws being adapted, upon screw rotation, to bear upon the larger end of said conical valve and collectively to exert axial, circumferentially distributed thrust upon the valve, whereby such valve is forced and secured to its conical seat.

THOR GANNESTAD.